United States Patent [19]

Rotter et al.

[11] 3,958,272

[45] May 18, 1976

[54] TURN AROUND METHOD AND CIRCUIT

[75] Inventors: Gerhard Rotter, Mission Viejo, Calif.; Ontje Arpe, Ludwigshafen, Germany

[73] Assignee: BASF Aktiengesellschaft, Ludwigshafen (Rhine), Germany

[22] Filed: Feb. 14, 1975

[21] Appl. No.: 549,896

Related U.S. Application Data

[63] Continuation-in-part of Ser. No. 443,411, Feb. 19, 1974, abandoned.

[52] U.S. Cl. .................................. 360/74; 360/29; 360/72
[51] Int. Cl.² ................. G11B 15/18; G11B 15/44; G11B 23/40
[58] Field of Search .................. 360/74, 71–72, 360/90, 13, 29, 33, 32, 31, 38, 62; 179/100.1 VC, 100.1 TC

[56] References Cited
UNITED STATES PATENTS

| | | | |
|---|---|---|---|
| 3,403,221 | 9/1968 | Van Den Bussche | 360/74 |
| 3,461,249 | 8/1969 | Kamoji et al. | 360/74 |
| 3,487,175 | 12/1969 | Newell | 360/74 |
| 3,557,320 | 1/1971 | Hopf | 360/74 |
| 3,573,393 | 4/1971 | Blackie | 360/74 |
| 3,702,908 | 11/1972 | Sugiura | 360/74 |

*Primary Examiner*—Alfred H. Eddleman

[57] ABSTRACT

A video tape recorder wherein the video signal is recorded on the tape as a frequency-modulated signal. The video recorder comprises a transport for the tape which is constructed suitably for reversing the direction of tape movement during signal recording and reproducing. The video signals are successively transduced on or from longitudinally extending parallel tracks on the tape. Initiating of the reverse movement of tape is improved by the use of a special high frequency signal. Said frequency also could be higher than the upper frequencies which can still be transduced by the used magnetic head at playback. Easily manufactured circuits are provided for the highly accurate detection of the special high frequency signal. Said frequency should be in a higher frequency range than the highest frequency of the video signals, more exactly above the white level of the video signals.

6 Claims, 8 Drawing Figures

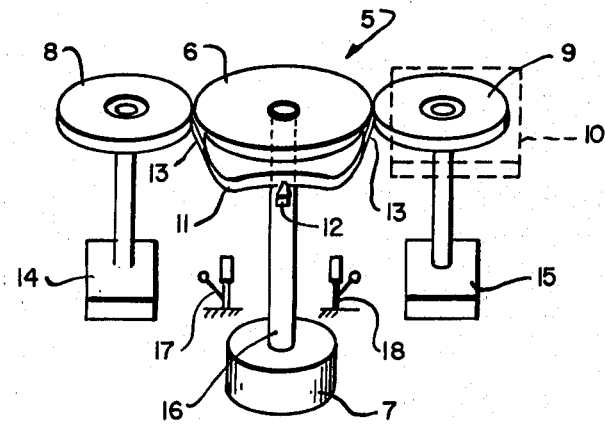
FIG. 1
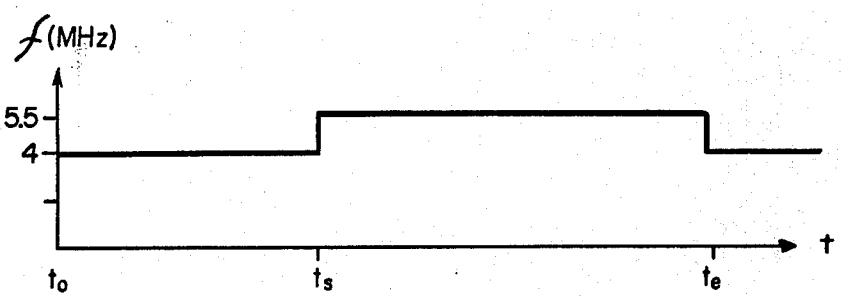
FIG. 2
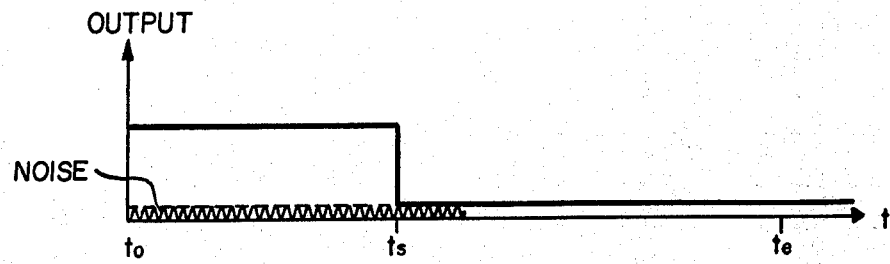
FIG. 3a
FIG. 3b

TURN AROUND METHOD AND CIRCUIT

This is a continuation-in-part of our application Ser. No. 443,411, filed Feb. 19, 1974, now abandoned.

BACKGROUND OF THE INVENTION

Video tape recorders which have been on the market in the past have recorded in only one direction on ¼ to 2-inch wide magnetic tape. These video recorders use a helical scan method which consisted of recording the signal diagonally to the longitudinal direction of the tape. Video tape recording systems more recently developed utilize ¼ inch wide magnetic tape and record the video signal longitudinally on the tape in multiple tracks of 20 or more across the width of the tape. These tape recording systems drive the video tape at speeds in the range of 120 inches per second, and they require the tape to be stopped at the end of each track and driven in the opposite direction while simultaneously changing from one track to another. Therefore, it is necessary that turn around of the tape from 120 inches per second in one direction to 120 inches per second in the opposite direction be achieved while at the same time assuring that the total distance traveled in changing directions is the same for all tape recording machines. It is also necessary that the video information which is recorded at the end of one track and at the beginning of the next track be recorded in such a manner that, at the time of turn around, minimum picture interference will result.

THE PRIOR ART

French Pat. Specification No. 1,449,667 describes a magnetic tape recorder only for tone recording and reproducing purposes. The transduction of the tone signals is therein achieved on or from two or more longitudinal extending parallel tracks on the tape, during movement of tape in one and then the opposite direction. At the end of a recorder tone signal, or at any other moment, a non-audible signal of 20 Hz is recorded on the tape for the purpose of initiating reversing operations. Such a 20 Hz signal is not useful in recording and reproducing video signals. The 20 Hz frequency is also far too low a frequency because a turn-around operation with great accuracy (tolerances under 0.1 milliseconds) is not possible if a sine wave with 50 msec. period is used.

The U.S. Pat. 3,487,175 teaches, furthermore, the necessity of using means for producing greater compressive forces between capstan and the associated tape packs during turn around in order to prevent tape damage. As described in co-pending application Ser. No. 388,929 filed Aug. 16, 1973, now U.S. Pat. No. 3,921,933, we have found that the change of the existing compressive forces between capstan and tape packs has many disadvantages. This teaching included in the co-pending application has even more importance if video signals are to be recorded and reproduced with such a transport, because each mechanical influence exerted during feeding of the tape produces distortions so that accurate recording and reproducing of the high frequency video signals is not possible. A further disadvantage is to be noted which consists in the use of an additional tone generator.

U.S. Pat. No. 3,487,175 describes a transport for a tape recorder, wherein the tape used is carrying longitudinally extending parallel tracks on which signals are to be successively transduced while moving the tape in one direction and then the opposite direction. This known transport includes means for initiation of the reversal movement of tape, using a tone signal which is recorded on tape and scanned at reproduction of signals. The tone signal is produced by a tone generator, which also is needed as an additional device. In this patent specification the use of the transport for recording of video signals is only indicated; however, special embodiments for this purpose are not described nor are they obvious to those skilled in the art.

Other means described in U.S. Pat. No. 3,487,175 concern the control of a head stepping device. Such device is not subject of this invention and is, therefore, not described.

OBJECTS OF THE INVENTION

The first object of this invention is to improve a video recorder comprising a transport of the above described type.

A second object of the invention is to provide such a transport with a device to initiate the reversal of tape movement which is highly accurate to such an extent that tapes and recorders are interchangeable, and any loss of video information is prevented.

A further object of the invention consists in the advantageous possiblity of recording frequency modulated audio signals during the reversal period with high quality at recording. The invention shall insure that side effects arising during reversal operation as e.g. noise increasing, amplitude changes will be avoided.

A further object of the invention is to prevent visibility of any irregularities on the video screen resulting from the reversal of the transport. A further important object is to be seen in disclosure of special circuits highly suitable to detect the reversal initiating signal without any possible error.

A further important object of the invention is to use, as nearly as possible, only the circuits which normally are used in video recorders operating with frequency modulation of the video and audio signals.

DESCRIPTION OF THE INVENTION

The invention relates to a video tape recorder of the above described type, wherein the following improved method is advantageous to use. The steps of this new method comprise recording of a high frequency signal in recording operation at that moment when the reversing operation of the transport is initiated, wherein the frequency range of the high frequency signal is predetermined as a range above the highest frequency (white level) of the FM-modulated video signals; detecting said high frequency signal as a drop-out signal within said predetermined frequency range in playback operation; and identifying the length of period of such a dropout signal in regard to a predetermined period; deriving a control signal from said dropout signal for initiating the reversal of tape movement if the identified length of period of said dropout signal is greater than said predetermined period.

The use of this method is very advantageous compared to the discussed methods of the prior art because of the achievement of much higher accuracy of the initiation of the reversal, greater interchangeability of tapes recorded on different recorders, and in particular, higher accuracy in recording and reproduction of video signals which are recorded on several tracks of a tape. Said frequency of the high frequency signal can also be situated in a higher frequency range than the upper limit of frequencies which can still be transduced off tape at playback of the recorded signals by the magnetic head used. In an advantageous embodiment of this invention the high frequency signal should be produced by switching the input of the oscillator of the frequency modulator to generate a high frequency signal above the frequency range, including the white level, of the FM-modulated video signal and said detecting operation of the high frequency signal in playback should be achieved by a dropout detector, in connection with a timing circuit, the output signal of which is used as a control signal for activating a switch means to initiate the operation of a turn around means of the transport.

Most of the before described units are normally used in video recorders and thus a very economical device can be used for the above mentioned technical application.

The tape used in such type of transport which makes use of the inventive method is carrying thereon at least one recorded signal having a frequency within a range above the highest frequency which is still reproducible by the magnetic head used wherein at least one signal functions to control the initiating operation for at least one reversal of tape movement in the tape transport. Heretofore, all known tapes carried signals lying under the defined upper frequency range or those tapes did not function to initiate reversals of tape movement.

BRIEF DESCRIPTION OF THE DRAWINGS

FIG. 1 shows a schematic tape transport of a video recorder.

FIG. 2 shows the relationship between switching times and tape lengths during the first of the two sections of reverse period.

FIGS. 3a and 3b are frequency-time diagrams of the recorded signals and reproduced signals during the first section of the reversing period.

DESCRIPTION OF THE PREFERRED EMBODIMENTS

During recording, the video tape recorder accepts video information which includes a vertical synchronizing pulse which occurs at intervals of 20 milliseconds on the European system (PAL) or 16.67 milliseconds on the United States system (NTSC). During playback of the recorded tape, these vertical synchronizing pulses can be detected by suitable electronics. As the tape reaches the end at which turn around is to be initiated, a micro-switch is triggered by a carriage on which the tape supply pack is mounted. From the time $t_0$ at which the micro-switch is triggered, an electronic delay 2, the circuit of which is merely diagrammatically indicated in FIG. 2 and shown in somewhat greater detail in FIG. 4, prevents initiation to turn around for a fixed time; and at the end of this delay, the next vertical synchronizing pulse 1 initiates the turn around sequence. The turn around sequence, which is initiated immediately after vertical pulse 1 is recorded, must be completed in slightly under 80 milliseconds for PAL (83.35 for NTSC), i.e., −1 millisecond + 0 millisecond. When turn around is accomplished in slightly under 80 milliseconds, the fourth vertical synchronizing pulse after vertical pulse 1 will be recorded on the next track of the tape. In this case three vertical synchronizing pulses remain unrecorded during the turn around period.

Figure 4:
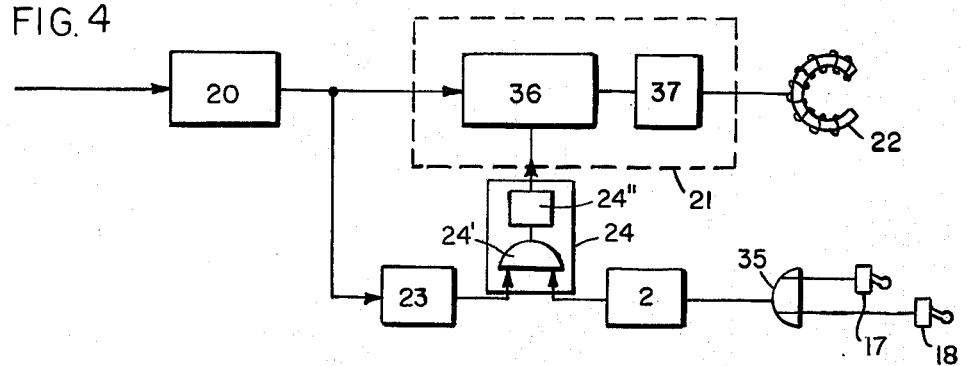
FIG. 4 shows a block diagram of the circuit elements for recording of the special signal for initiating the reverse movement of tape.

The new transport 5, FIG. 1, for a video recorder includes a capstan 6 driven by a motor 7; two freely mounted tape packs 8 and 9, pack 9 being partly contained by a cassette 10 (shown by dotted lines); a stationary tape air guide means 11; and a magnetic transducer 12 for the tape 13 spanning the guide means 11; and a magnetic transducer 12 for the tape 13 spanning the guide means 11. Packs 8 and 9 are rotatably mounted on carriages 14 and 15 which are slidable in the direction of a diameter of capstan 6. In the shown transport 5, the pack 9 located within the cassette 10 serves as supply pack and pack 8 serves as take up pack. Both packs 8 and 9 are driven in edge contact by the circumference of capstan 6. Between carriages 14 and 15 and shaft 16 of motor 7, there are provided two fixedly mounted switches 17 and 18, FIGS. 1 and 4, in particular microswitches, which control an electronic logic circuit 35, FIG. 4, for a switching operation within a period of few microseconds, which equals a very small movement of the carriages 14 or 15. As indicated in FIG. 4, circuit 35 which is in the form of an OR gate has two ORred inputs from the two microswitches 17 and 18. In FIG. 1 where the tape supply is pack 9, switch 18 will be operated and thereby activate the delay means 2. The delay time $t_D$, FIG. 2, should be about 1.5 seconds. After time $t_D$ at the time $t_s$ (indicated as an arrow on the upper edge of tape 13), the reverse operation is automatically initiated as will be clear from FIGS. 2 to 4. During recording, the video signal will be shaped by electronic device 20 and thereafter frequency modulated by means of a modulator 21 including, for example, an adder 36 described below and a voltage controlled oscillator 37 for converting the received amplitude modulated signal into frequency modulated form. The adder, as well known in the art, may simply consist, for example, of two resistances connected together at their output end. Voltage controlled oscillators likewise are well known in the art, including the art of video recording. One such oscillator designed for frequency modulation of a carrier signal by a video signal in video recording has been disclosed, for example, in U.S. Pat. No. 3,425,000, issued Jan. 28, 1969. By the modulation process the amplitudes of the video signal are transferred to frequencies lying with the range of 2 to 4 mH$_z$. FIGS. 3a and 3b show the signals at recording and playback respectively. The special high frequency whose generation will be explained hereinafter, should be higher than the 4 MH$_z$ frequency which is representative of the white amplitudes of the original video information.

A transducer 22 is connected to the output of modulator 21. The output of the device 20 is also led to a detector means 23 which detects the vertical synchronizing signal 1. Signals coming from detector means 23 and delay means 2 go to a coincidence device 24 in the form of a conventional AND gate 24' followed by a conventional one-shot 24", for example, where in the moment of coincidence of both signals a d.c. control signal in the order of, say, 4 volts, is fed to the second input of adder 36 in modulator 21. The superposition, in adder 36, of this d.c. control signal on the received amplitude modulated video signal raises the input of voltage controlled oscillator 37 by a corresponding amount and thereby causes this oscillator to produce a special signal with higher frequency than necessary for regular video recording or, more particularly, a super white signal. The d.c. control signal generating this super white signal is impressed on the input side of the modulator 21 together with the video signals, as shown in FIG. 4 but, alternatively, it would also be possible to supply this control signal in lieu of the video signals. At any rate, the frequency of the special signal should have such a height that it is guaranteed that, as illustrated by FIG. 3b, a high decrease in the level of the reproduced video signal will be reached, with respect to the level corresponding to the 4 $MH_z$ frequency representative of the white amplitudes. It has been found that the frequency of the special signal should lie in the range above the highest frequency which can still be reproduced by the used magnetic head.

In FIG. 3a, the special signal has a frequency in the range of 5 – 5.5 $MH_z$ which cannot be reproduced by a head with a gap of nearly 0.4 micron width and 120 inches per second tape speed. According to the aforesaid, the output signal at playback at time $t_s$ is in the range of the noise signals effected by the used tape (shown in FIG. 3b) though a decrease in the output level of nearly 20 dB is reachable in practice. In FIG. 3a, the special signal will be fully recorded during the first half of the reverse period. At the time $t_e$ no signal is recorded on the tape because the tape speed is decreasing to zero.

The lower limit of the length of the period of the special signal is the greatest time period of the occurrence of dropouts (loss of signal) coming from the tape. Accordingly, the minimum period of the special signal should merely be no shorter than 200 /useconds, which is equal to about three line periods. The upper limit of the special signal's period is the time necessary for the performance of the turn around of the transport. As aforesaid, this period has a length of about 80 msecs. It has been found that it is sufficient to use this special signal only within the first half of the whole turn around period.

Figure 5:
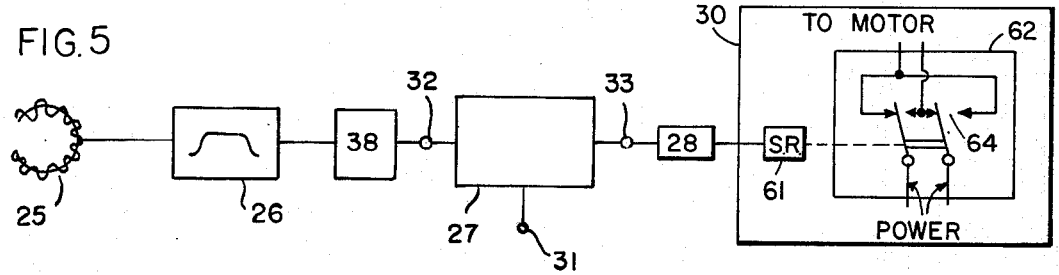
FIG. 5 shows a block diagram of the playback circuit.

It will be clear from the foregoing that by the use of the special high frequency signal an accurately determined dropout signal is produced at the initiation point of the turn around. This dropout signal is to be detected at the playback process of the signals recorded on tape. FIG. 5 shows a block diagram of the playback circuit.

Playback signals coming off tape are scanned by the playback head 25 which can also be combined with recording head 22. Thereafter, signals go through a band pass filter 26, which separates the frequency signals in the range between 2 and 4 $MH_z$ and thence to a combination limiter and frequency demodulator 38 which yields a video signal in amplitude modulated form. Such frequency demodulation means are well known in the art, including that of video recording. The circuit details of one such frequency demodulator for use in connection with the video playback system of a television tape recorder have been disclosed, for example, in FIG. 1 of U.S. Pat. No. 3,296,539, issued Jan. 3, 1967, on a Pulse Counter Demodulator. As shown in FIG. 2 of the patent the demodulator – which consists of the pulse counter proper and a low pass filter connected to its output — is preceded by a limiter. As described in the patent, the limiter reduces the peaks of the waves of the incoming frequency modulated signal, thereby presenting to the pulse counter a wave form consisting in effect of a train of rectangular pulses of varying widths, and the low pass filter processes the output of the pulse counter into a variable DC video signal. The dropout detecting circuitry 27 following demodulator 38 normally passes these signals from its input 32 to its output 31 which leads to the video receiver not shown; and it also acts, in conjunction with limiter/demodulator 38, in a manner hereinafter described with reference to FIG. 6, to detect a drop in the signal level as a dropout.

As to bandpass filter 26 it may be noted at this point that a signal in a frequency range of 5 – 5.5 $MH_z$ can be detected (as a dropout) in any case and used for initiation of the turn around operation because, even if the head technology is improved in the future, the bandpass filter 26 would remove any 5 or 5.5 $MH_z$ component.

When a dropout signal is detected and a corresponding signal developed at output 33 of the dropout detecting circuitry 27 as explained below, time delay/threshold stage 28 will be activated, which checks the period of the occurring dropoud signal. If the period is longer than a predetermined period, which is, for example, a period of about 200 /usec or longer, operation of the turn around means 30 is initiated.

As an example, a dropout detector 27' of known embodiment and function will be described hereunder. Naturally, it is possible to use any suitable circuit for the dropout detection.

Figure 6:
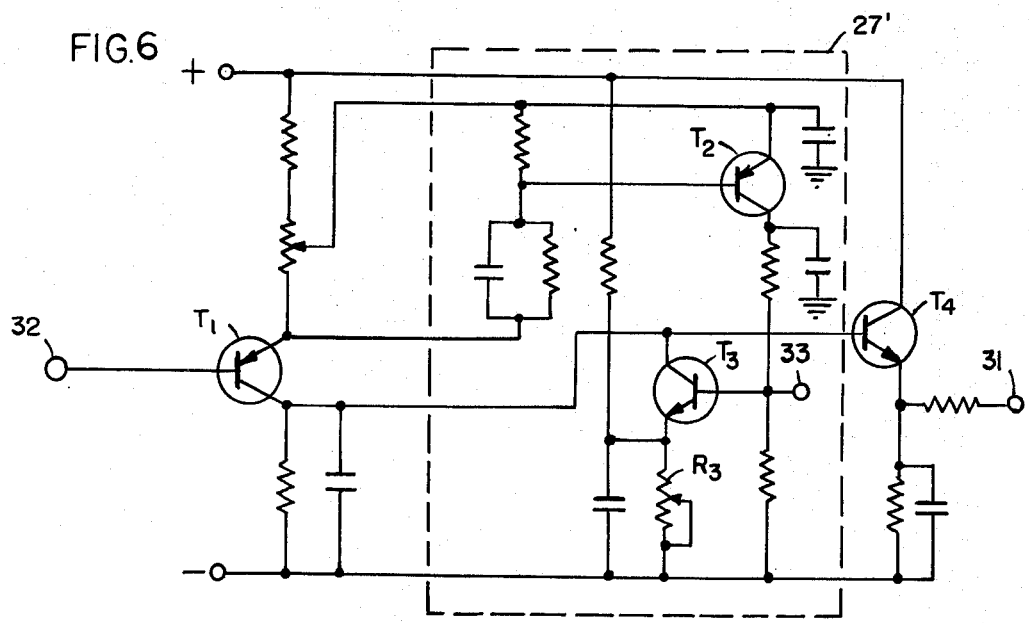
FIG. 6 shows a dropout detector circuit.
Figure 7:
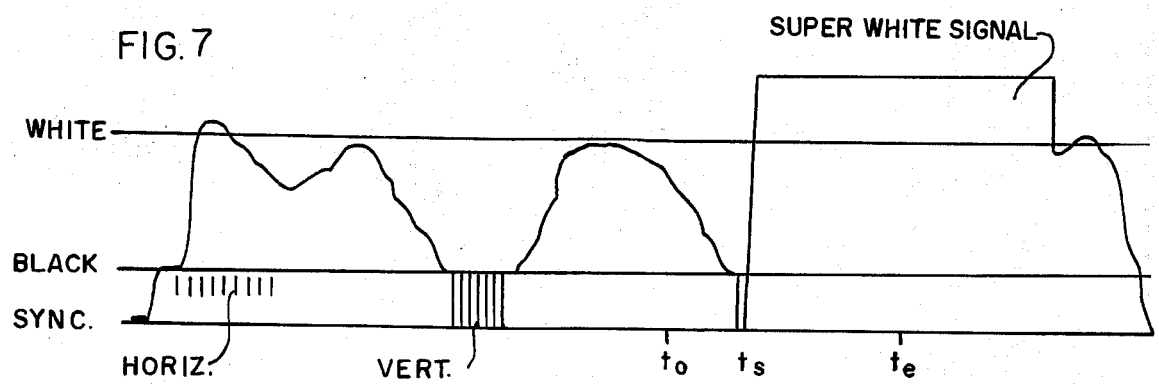
FIG. 7 shows signal curves representing a video signal before modulation and the super white signal according to this invention.

FIG. 6 shows such an embodiment of dropout detector 27' proper within a section defined by dotted lines, together with associated signal amplifiers $T_1$ and $T_4$ which are also a part of overall dropout circuitry 27. The video signal coming off tape enters the circuit at point 32, which is connected to the base of transistor $T_1$. If a dropout signal occurs, the limiter and frequency demodulator 38 of the video circuit (not shown) no longer receives a signal off tape, and the circuit starts to limit and demodulate preamplified noise signals. Thereby large noise spikes having a greater amplitude than the video signal occur in the output signal of the frequency modulator. These spikes are detected by the dropout detector 27'. A transistor $T_2$ detects a dropout above a threshold adjustable by a potentiometer in the collector circuit of transistor $T_1$ as shown, and becomes conductive so that a positive voltage jump is produced at the base of transistor $T_3$. As a result transistor $T_3$ will also become conductive, thereby placing a shunt across the video signal output of transistor $T_1$ via resistor $R_3$ and hence impressing a grey color signal, adjustable by varying the resistance of the resistor $R_3$, on the base of transistor $T_4$ and from its emitter on video out point 31. At point 33 time delay/threshold stage 28, FIG. 5 is connected, with the time delay of this stage implemented, for example, by an integrating circuit (resistor and capacitor). The integrating circuit must be so dimensioned that after the described predetermined period, for example, a period of 200 /usec, activation of the turn around means 30 is initiated. The turn around itself can be brought about, for example, by switching means included in block 30 but, which cause the polarity of the circuit of the tape drive motor of the tape transport apparatus to be reversed and the head or heads of this apparatus to be stepped to the next track of the tape. Arrangements of this kind are known per se; one is described, for instance, U.S. Pat. No.

3,487,175 referred to above. In keeping with the reference numerals used in this last-mentioned patent there has accordingly been indicated within block 30, a stepping relay 61 which is energized under the control of time delay stage 28 on each reversal operation so as to change the state of motor reversing control 62 once for each operation of stepping relay 61. Motor reversing control 62 is in the form of a double-throw double-pole switch. It will be understood that stepping relay 61 could also be replaced by an electronic circuit element such as a flip-flop if desired.

Advantageously, the dropout detector could include logical chips and the transistors $T_2$ and $T_3$ can be advantageously replaced by field effect transistors. The described circuit has the additional advantage that in case of further improvements in magnetic head technology a head would be used which can recover a 5 – 5.5 $MH_z$ signal, the described circuit would still detect the high frequency signal and, therefore, control initiation of the turn around because the super white level would be beyond the activation threshold for dropouts.

Most of the stages described herein are normally used in video recorders employing frequency modulation of the video and audio signals. As indicated above, the dropout detector 27 acts as a usual circuit when no special signal occurs. By the automatic insertion of the grey level in each dropout period the visibility of dropouts on the screen is advantageously prevented.

Outside the period of reversal, the tone signals accompanying the video signals are also frequency modulated and recorded by use of the video carrier frequency as bias frequency. Now, if such a special signal is used, the tone signals can also be recorded within the reversal period, whereby the high quality of the reproduced tone signals can be maintained during this period. This is because the wavelength of the sound carrier is 40 times longer than the wavelength of the video information; therefore, the sound carrier can still be recovered at very low tape speeds which occur during turn around.

The described embodiments of the invention showing the advantages which will arise when a special signal is used in a tape transport in which the direction of tape movement must be reversed several times are not meant to limit the scope of the invention. The coverage of the following claims shall include all other applications in which the use of such a special high frequency signal for the control of the reversal of tape movement in video recording apparatus is necessary and advantageous.

We claim:

1. In a tape video recorder wherein the video signal is recorded on a tape as a frequency modulated signal, including a tape transport apparatus of the type arranged to reverse the direction of tape movement within an extremely short period of time, and wherein the recording of at least video signals is continued while the reversing operation is performed, the improved turn around method comprising
   a. recording of a high frequency signal in recording operation at the moment when the reversing operation of the transport is initiated, the frequency range of the high frequency signal having a predetermined range above the highest frequencies of the frequency modulated video signals;
   b. detecting said high frequency signal as a dropout signal within a predetermined frequency range in playback operation;
   c. identifying each dropout signal occurring within said predetermined frequency range in regard to its duration; and
   d. deriving a control signal for initiating the reversal of tape movement if the length of the identified duration of said dropout signal is greater than a predetermined time interval.

2. In a tape video recorder, the method according to claim 1, wherein the high frequency signal has a frequency in a range above the highest frequencies which are still reproducible by the used magnetic head.

3. In a tape video recorder, the method according to claim 2, wherein the recorded tape carries at least one signal having a frequency within a range above the highest frequencies which are still reproducible by the used magnetic head and wherein said at least one signal controls the initiation of at least one tape reversing operation in the tape transport.

4. In a tape video recorder, the method according to claim 1, further comprising producing said high frequency signal by switching the input signal of the frequency modulator to a higher frequency compared to the video frequencies, detecting the high frequency signal in playback by a dropout detector, and using the output signal of a timing circuit as a control signal for initiating operation of a turn around means of the transport.

5. In a tape video recorder, the method according to claim 1, wherein the recorded tape carries at least one signal having a frequency within a range above the highest frequencies corresponding to the white level of the video signals, and wherein said at least one signal controls the initiation of at least one tape reversing operation in the tape transport.

6. In a video tape recorder in which the video signal is recorded on the tape as a frequency modulated signal and which includes a tape transport apparatus of the type arranged to reverse the direction of tape movement within a very short period of time, a circuit arrangement for initiating reversal of tape movement, said arrangement comprising:
   means effective during the recording operation to record, at the moment of initiation of tape transport reversal, a high frequency signal of a predetermined frequency range lying above the highest frequencies of the frequency modulated video signals;
   means effective during the playback operation to detect said high frequency signal as a dropout signal within a predetermined frequency range; and
   means effective if said dropout signal has been found to have a predetermined minimum length, to initiate said reversal of tape movement.

* * * * *